Sept. 27, 1932.  W. S. BREMER  1,879,970

HEAT REFLECTING AND CONDUCTING BOWL FOR HEATERS

Filed March 28, 1930

Inventor
William S. Bremer,

Witnesses:

Patented Sept. 27, 1932

1,879,970

UNITED STATES PATENT OFFICE

WILLIAM S. BREMER, OF CHICAGO, ILLINOIS

HEAT REFLECTING AND CONDUCTING BOWL FOR HEATERS

Application filed March 28, 1930. Serial No. 439,705.

This invention relates to heat reflecting and conducting enclosures to be used in conjunction with electric stoves to reflect heat generated by an electric heating element.

The bowls in common use today are primarily heat reflecting devices, the advantage of a bowl so constructed as to efficiently conduct as well as reflect heat being entirely overlooked.

To utilize most efficiently the heat of a burner of certain type, and to conduct the greatest possible amount of B. t. u.'s to a cooking receptacle mounted above the same, necessitates the utilization of means for preventing heat loss through the exterior surface of said bowl and means whereby the generated heat is rapidly absorbed by the interior surface of the bowl.

In order that the absorbed heat may be quickly transmitted to the cooking utensil, the bowl must necessarily be constructed of a material the relative conductivity of which is extremely high.

A specific embodiment of my invention is shown in the accompanying drawing, in which.

Figure 1:
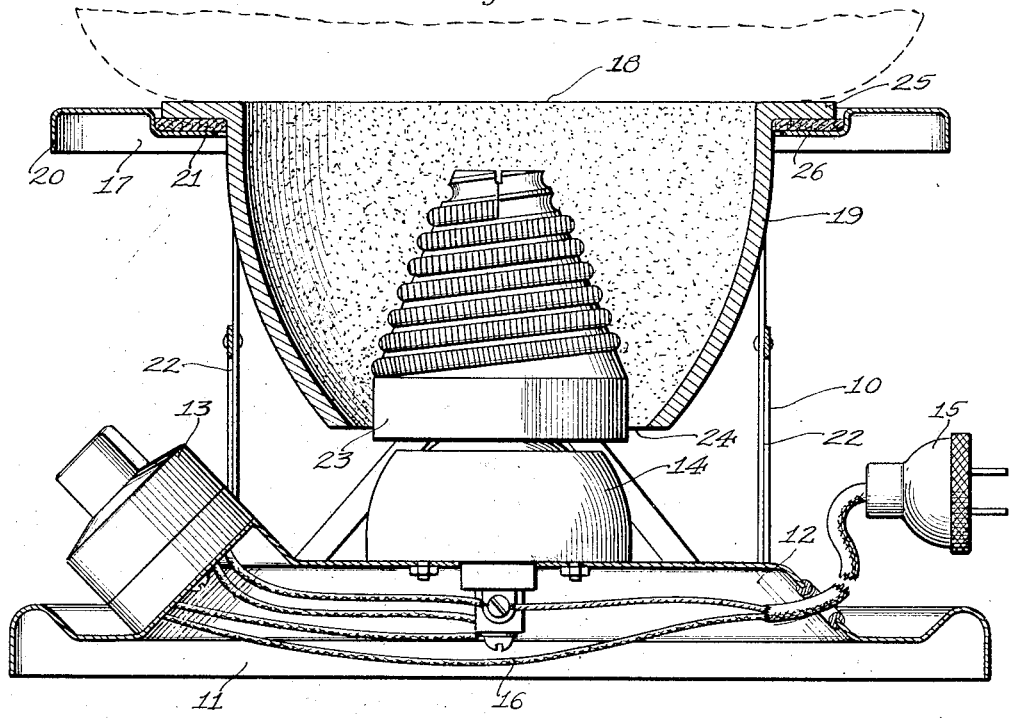
Figure 1 is a vertical sectional view disclosing my invention as applied to an electric stove.
Figure 2:
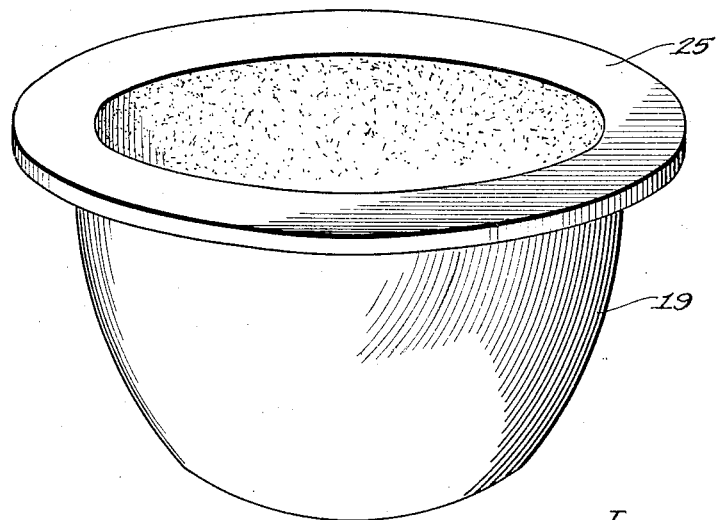
Fig. 2 is a perspective view of my improved heat concentrating bowl disassembled from the stove.

The numeral 10 indicates generally a small electric cooking stove which forms no part of the invention except in its relation to my improved bowl. It consists of a base 11 having integral therewith a raised fixture mount 12 on a sloping side of which is attached a standard three-way electric switch 13. Fixed in the center of the said fixture mount 12 is a porcelain plug socket 14, which is wired in series with the switch 13 and a standard connecting plug 15, the wiring being generally indicated by the numeral 16. A platform 17 is supported above the base and has a circular aperture 18 centrally located therein to accommodate the heat concentrating bowl 19, which forms the main subject matter of my invention.

In the forming of the platform 17, the outer edge thereof is pressed downwardly to form a shoulder 20 and the inner margin of the aperture 18 is offset downwardly to form a depressed supporting shoulder 21.

The platform 17 is rigidly braced by members 22, whose ends are fixed to the base and platform.

An electric heating element 23 is provided, of standard construction in every particular except that its exterior configuration is conical instead of cylindrical, as is the shape of heating elements commonly used. This heating element is adapted to be screwed into the socket 14.

The bowl 19 is preferably made of an aluminum alloy, the proportion of the ingredients constituting the alloy being from 5% to 10% silica, and the balance aluminum, this alloy being porous and a rapid conductor of heat.

The said bowl is approximately $\frac{3}{16}''$ thick, parabolically shaped and apertured at 24 so as to permit its being placed over the heating element, when the said bowl is assembled on the stove. The bowl has a flange 25 approximately $\frac{5}{16}''$ in thickness and $\frac{3}{4}''$ in width, extending outwardly from the peripheral top edge thereof, the contour and dimensions of said flange being such as to enable it to seat in the depression made in the forming of the shoulder 21.

The thickness of the flange is about the same as the depth of the depression, but it is essential that the flange of the bowl project above the platform so that cooking utensils placed thereupon will not contact with said platform. To accomplish this an asbestos washer 26 is fitted into the depression made in the forming of the shoulder 21, and the width of this washer plus the thickness of the flange on the bowl will cause the upper face of said flange to project above the platform.

The washer 26 is proportioned so as to insulate the bowl from the platform. The aperture 18 is large enough to provide clearance and an air space at its edge when the bowl is in place.

In the manufacture of the bowl the exterior surface thereof receives a high polish to close the exterior pores of the metal and reduce radiation to a minimum, and the interior surface is roughened, as by an abrasive material, so as to adapt it to quickly absorb heat.

The operation of the device shown is as follows: The plug 15 is inserted in any convenient socket, the current is transmitted to the heating element by turning on the switch 13 and in a short time the heating element will begin to radiate heat. Some of the heat will radiate directly to the bottom of the utensil which is placed in or on the top of the bowl, and some will be carried to the utensil by convection by air entering the aperture 24. However, a large proportion of the radiated heat will be absorbed by the porous roughened interior surface of the bowl, and because of the relatively high conductivity of the metal from which it is formed it will be rapidly transmitted to the flange 25 and there transmitted to the bottom of the utensil resting thereupon.

Due to the high polish on the exterior of said bowl, very little of the conducted heat will be dissipated through the exterior surface thereof. Thus the heat loss is materially diminished, and the heat is delivered to the utensil in a most effective manner. The parabolic curvature of the bowl insures that any heat reflected by the inner surface will be directed to the utensil above.

Thus my invention provides four separate and distinct methods of transmitting heat from the heating element to the bottom of the utensil placed upon the top of the bowl; namely, by direct radiation, by convection, by reflection, and by absorption and conductivity through the material of the bowl. Furthermore, because of the means used to prevent the dissipation of heat through the exterior surface of the bowl, the interior of the bowl will remain hot and continue to heat the utensil for a greater period of time after the current is cut off than if the outer surface were not treated to prevent the dissipation of the heat.

While the application of my invention is herein illustrated in an electric stove, it is applicable to other forms of heating units, and although but one specific structure has been herein shown and described, it will be understood that numerous details may be altered or omitted without departing from the spirit of the invention as defined by the following claims.

I claim:

1. A heat dispensing device comprising in combination a base, a parabolically shaped heat conductive and reflective bowl supported by said base, a heating element in said bowl, a flange on said bowl adapted to hold said bowl suspended, a nonconductive washer between said flange and base, and means for controlling said heating element, said bowl having homogeneous metallic walls.

2. An electric stove appliance comprising a frame having a raised platform, in combination with a heat concentrating bowl carried by the platform, an electric heater element carried by said frame below said platform and projecting upward into said bowl, the latter being axially perforated to accommodate the bowl, with lateral draft clearance, and a heat insulating ring disposed between said platform, and a corresponding flange on the top rim of said bowl, which bowl is metallic with polished outer and roughened inner surfaces respectively.

Signed at Chicago this 24th day of March 1930.

WILLIAM S. BREMER.